US008630592B2

(12) United States Patent
Rajamani et al.

(10) Patent No.: US 8,630,592 B2
(45) Date of Patent: Jan. 14, 2014

(54) SYSTEM AND METHOD FOR TRIGGERING A WIRELESS CONNECTION

(75) Inventors: Krishnan Rajamani, San Diego, CA (US); Atul Suri, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 285 days.

(21) Appl. No.: 12/607,382

(22) Filed: Oct. 28, 2009

(65) Prior Publication Data

US 2010/0261510 A1  Oct. 14, 2010

Related U.S. Application Data

(60) Provisional application No. 61/169,099, filed on Apr. 14, 2009.

(51) Int. Cl.
*H04B 1/40* (2006.01)
(52) U.S. Cl.
USPC .......................................... 455/74; 455/74.1
(58) Field of Classification Search
USPC ............. 455/574, 74, 74.1, 41.2, 41.3, 556.1, 455/557, 502; 379/90.01, 93.01
See application file for complete search history.

(56) References Cited

U.S. PATENT DOCUMENTS

| 4,124,815 A | * | 11/1978 | Stoschek | ........................ | 455/517 |
| 6,091,362 A | * | 7/2000 | Stilp et al. | ..................... | 342/465 |
| 2002/0060994 A1 | | 5/2002 | Kovacs et al. | | |
| 2002/0159419 A1 | | 10/2002 | Morris | | |
| 2003/0050009 A1 | * | 3/2003 | Kurisko et al. | ................. | 455/41 |
| 2004/0008633 A1 | | 1/2004 | Youn | | |
| 2007/0042745 A1 | | 2/2007 | Tezuka | | |
| 2008/0063216 A1 | | 3/2008 | Sakata et al. | | |
| 2008/0227393 A1 | | 9/2008 | Tang et al. | | |
| 2009/0002546 A1 | | 1/2009 | Toyoda et al. | | |

FOREIGN PATENT DOCUMENTS

| CN | 101291483 A | 10/2008 |
| JP | 2006080828 A | 3/2006 |
| JP | 2006148311 A | 6/2006 |
| JP | 2007013328 A | 1/2007 |
| JP | 2007110343 A | 4/2007 |
| JP | 2008092546 A | 4/2008 |
| JP | 2008219809 A | 9/2008 |
| JP | 2009010750 A | 1/2009 |
| JP | 2009060717 A | 3/2009 |
| WO | WO02003625 | 10/2002 |
| WO | WO2008112497 | 9/2008 |

OTHER PUBLICATIONS

International Search Report and Written Opinion—PCT/US2010/031050, International Search Authority—European Patent Office—Jul. 5, 2010.
Taiwan Search Report—TW099111661—TIPO—Feb. 21, 2013.

* cited by examiner

*Primary Examiner* — Eugene Yun
(74) *Attorney, Agent, or Firm* — Donald C. Kordich

(57) ABSTRACT

Systems and methods displaying information from a mobile device are described herein. One embodiment of this disclosure provides method of triggering a wireless connection. The method comprises detecting a wired connection at a mobile device. The method further comprises adjusting a power to a wireless interface based on the detection of the wired connection.

33 Claims, 7 Drawing Sheets

SYSTEM AND METHOD FOR TRIGGERING A WIRELESS CONNECTION

CROSS REFERENCE TO RELATED APPLICATION(S)

This application claims the benefit of U.S. Provisional Application No. 61/169,009, filed Apr. 14, 2009, the entire content of which is incorporated herein by reference.

BACKGROUND

1. Field

This application relates generally to mobile devices, and more specifically, to cell phone displays.

2. Background

Mobile devices (e.g., phones, smartphones, Personal Digital Assistants (PDAs), Ultra-Mobile Personal Computers (UMPCs), Mobile Internet Devices (MIDs), etc.) may automatically connect to other devices using a wireless connection when the mobile device detects that a compatible device is within range. In such cases, the mobile device has a wireless modem switched on and periodically scans for broadcast messages from other wireless devices that are within communication range of the mobile phone. When the mobile device receives a broadcast message from another wireless device, it can automatically connect with the other device and begin transmitting and/or receiving data. This requires additional power consumption to power the wireless modem of the mobile device as it periodically scans for other devices. Thus, a need exists to eliminate this additional power consumption.

SUMMARY

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages that include improved power consumption in a mobile device.

One embodiment of this disclosure provides method of triggering a wireless connection. The method comprises detecting a wired connection at a mobile device. The method further comprises adjusting a power to a wireless interface based on the detection of the wired connection.

Another embodiment of this disclosure provides a method of triggering a wireless connection. The method comprises detecting a wired connection at a mobile device. The method further comprises establishing the wireless connection between the mobile device and a second device.

Yet another embodiment of this disclosure provides a wireless communication device. The wireless communication device comprises a wired interface. The wireless communication device further comprises a wireless interface. The wireless communication device further comprises a first processing circuit configured to detect a wired connection at the wired interface. The wireless communication device further comprises a second processing circuit configured to adjust a power to the wireless interface based on the detection of the wired connection.

A further embodiment of this disclosure provides a wireless communication device. The wireless communication device comprises means for detecting a wired connection at a mobile device. The wireless communication device further comprises means for adjusting a power to a wireless interface based on the detection of the wired connection.

Yet a further embodiment of this disclosure provides a computer program product, comprising computer-readable medium comprising code for causing a computer to detect a wired connection at a mobile device; and code for causing a computer to adjust a power to a wireless interface based on the detection of the wired connection.

DETAILED DESCRIPTION

Figure 1:
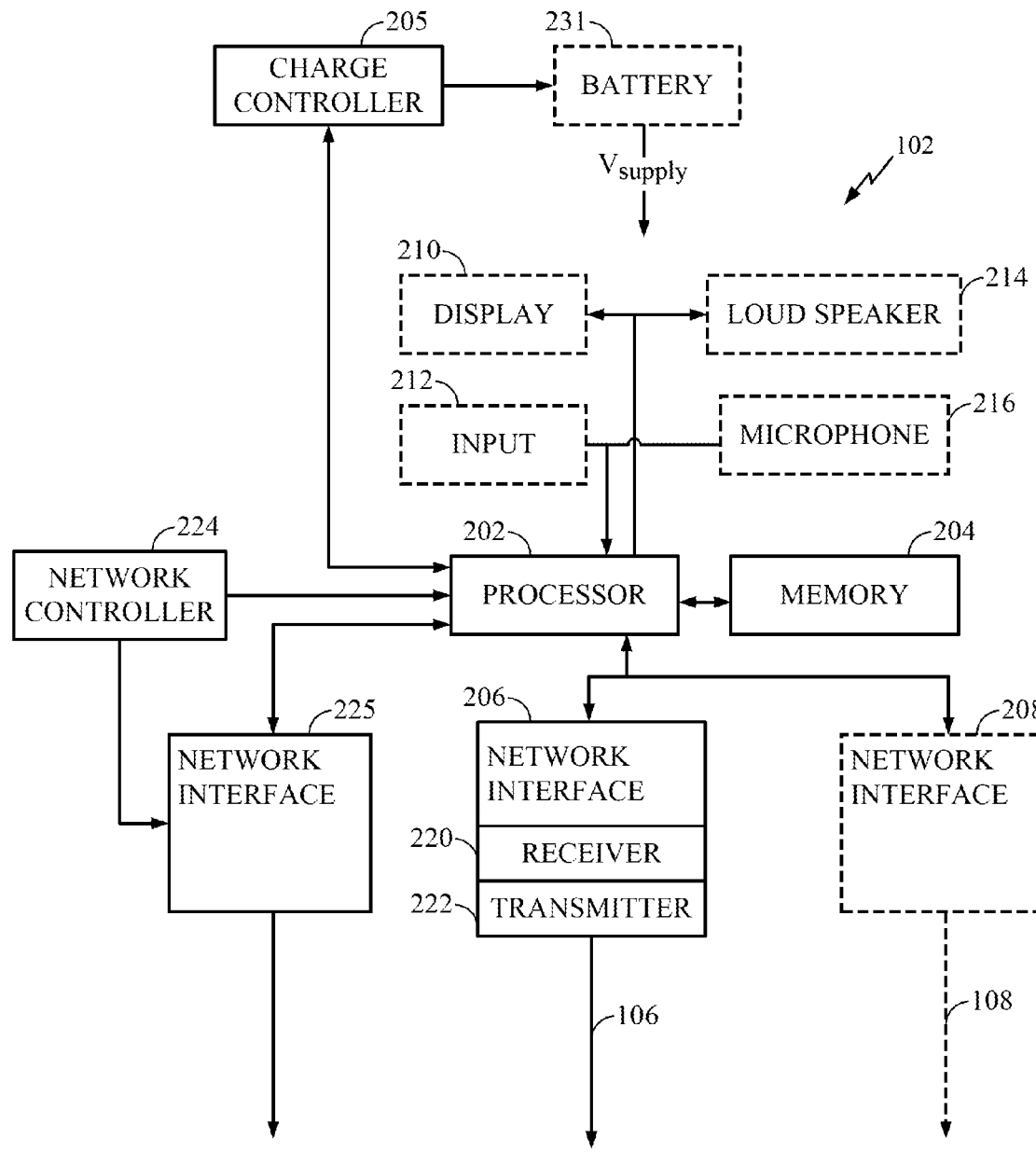
FIG. 1 is a block diagram illustrating an example of a mobile device.

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects connections between mobile devices and displays may be based on wireless protocols. In some aspects, communication channels between devices may be based on a wired data transmission.

Mobile devices (e.g., phones, smartphones, Personal Digital Assistants (PDAs), Ultra-Mobile Personal Computers (UMPCs), Mobile Internet Devices (MIDs), etc.) typically can be connected to other devices over a wireless connection (e.g., BLUETOOTH). The mobile device may be configured to automatically detect a second device that is capable of connecting wirelessly with the mobile device and initiate a connection. However, increased power consumption occurs in the mobile device to power a wireless modem that continuously scans for other wireless devices in order to automatically initiate a connection. Methods and devices are described herein to reduce power consumption at a mobile device by intelligently powering the wireless modem of the mobile device. Set forth below are some architectures that may be used in conjunction with the described methods and devices.

Personal or body area networks may be defined by devices that have "paired" with each other. Pairing is a process by which devices register with each other, including under user control. Once paired, devices typically can communicate with each other whenever they are within range and active without re-performing the pairing process.

Before pairing, devices must first discover each other, for example, by entering a discoverable state in which devices discover each other through the exchange of discovery messages. Upon discovery, devices may pair with each other. Pairing is at least partly a security function to limit pairing to particular devices. For example, pairing may include an exchange of messages that may include password authentication schemes in which first device must respond with a password (such as a four digit number, which is often fixed at the factory for a device) to a second device to prevent unauthorized or undesired pairing of devices. In networking protocols such as Bluetooth, discovery and pairing are separate procedures. However, they are most often performed together. Once paired, the devices are registered with each other and may automatically connect when within range and active.

Typically, in order to automatically form such a wireless connection when devices are within range, one of the devices is in a page scan mode. In page scan mode, the wireless device continuously scans for a message from another device. This scanning requires a wireless modem of the device to be turned on, which consumes power. A second device may be in a page mode. In the page mode, the second device periodically broadcasts a message. A first device in a page scan mode will detect the message when the devices are within range and initiate a wireless connection.

FIG. 1 is a block diagram illustrating an example of a mobile device 102. The device 102 includes a processor 202 that is in communication with a memory 204 and, optionally, a network interface 206 for communicating via the wireless link 106. Optionally, the device 102 may also include one or more of a display 210, a user input device 212 such as a key, touch screen, or other suitable tactile input device, a loudspeaker 214 comprising a transducer adapted to provide audible output based on a signal received over the wireless link 106 and/or a microphone 216 comprising a transducer adapted to provide audible input of a signal that may be transmitted over the wireless link 106. For example, the device 102 may include the display 210 adapted to provide a visual output of a graphical user interface (GUI). The device 102 may also include a charge controller 205 that interfaces with a cable of a charger. When a charger is coupled to the device 102 via the charge controller 205, the battery 231 receives a charge and/or the charge controller 205 powers the device 102. The charge controller 205 may further be in communication with the processor 202. The charge controller 205 may indicate to the processor 202 that a charger is coupled to the device 102. The network interface 206 may transmit and receive signals as CDMA, GSM, AMPS or other known signals that are used to communicate within a wireless cell phone network The network interface 206 may include any suitable antenna (not shown), a receiver 220, and a transmitter 222 so that the exemplary device 102 can communicate with one or more devices over the wireless link 106. Optionally, the network interface 206 may also have processing capabilities to reduce processing requirements of the processor 202. In one embodiment, the network interface 206 may comprise a wireless modem.

Optionally, the device 102 may include a second network interface 208 that communicates over a network (e.g., a wide area network such as the Internet) via a link 108. For example, the device 102 may provide connectivity to the network via a wired or wireless communication link. In addition, it should be appreciated that one or more of the devices 102 may be portable or, in some cases, relatively non-portable. The second network interface 208 may transmit and receive RF signals according to the IEEE 802.11 standard, including IEEE 802.11(a), (b), or (g), the BLUETOOTH standard. In addition, the second network interface 208 may comprise any suitable wired network interface such as Ethernet (IEEE 802.3) or USB. Second network interface 208 may also comprise a suitable wired display interface such as a Mobile Display Digital Interface (MDDI), High-Definition Multimedia Interface (HDMI), Mobile High-Definition Link (MHL), TVOut, Video Graphics Array (VGA), Digital Visual Interface (DVI), etc. The device 102 may also include a third network interface 225 similar to the second network interface 208. In one embodiment, second network interface 208 comprises any suitable wired interface and the third network interface 225 comprises any suitable wireless interface. In one embodiment, the third network interface 255 may comprise a wireless modem.

The third network interface 225 may be in communication with a network controller 224. The network controller 224 may control turning the third network interface 225 on and/or off. For example, the network controller 224 may be configured to turn on the third network interface 225 allowing the device 102 to communicate with another device via the third network interface 225. The network controller 224 may further be in communication with the processor 202. The network controller 224 may receive information from the processor 202 such as whether device 102 is connected to a charger via the charge controller 205 or whether device 102 is connected to a wired device via the network interface 208. The network controller 224 may use such information to determine how to control the power to the third network interface 225.

The device 102 may include a battery 231 to provide power to one or more components of the device 102. The device 102 may comprise at least one of a phone, smartphone, Personal Digital Assistant (PDA), Ultra-Mobile Personal Computer (UMPC), Mobile Internet Device (MID), or any other mobile device. In particular, the teachings herein may be incorporated into (e.g., implemented within or performed by) a variety of the devices 102.

The components described herein may be implemented in a variety of ways. Referring to FIG. 1, the device or apparatus 102 is represented as a series of interrelated functional blocks that may represent functions implemented by, for example the processor 202, software, some combination thereof, or in some other manner as taught herein. For example, the processor 202 may facilitate user input via the input devices 212. Further, the transmitter 222 may comprise a processor for transmitting that provides various functionalities relating to transmitting information to another device 102. The receiver 220 may comprises a processor for receiving that provides various functionality relating to receiving information from another device 102 as taught herein.

As noted above, FIG. 1 illustrates that in some aspects these components may be implemented via appropriate processor components. These processor components may in some aspects be implemented, at least in part, using structure as taught herein. In some aspects, a processor may be adapted to implement a portion or all of the functionality of one or more of these components. In some aspects one or more of the components represented by dashed boxes are optional.

Figure 2:
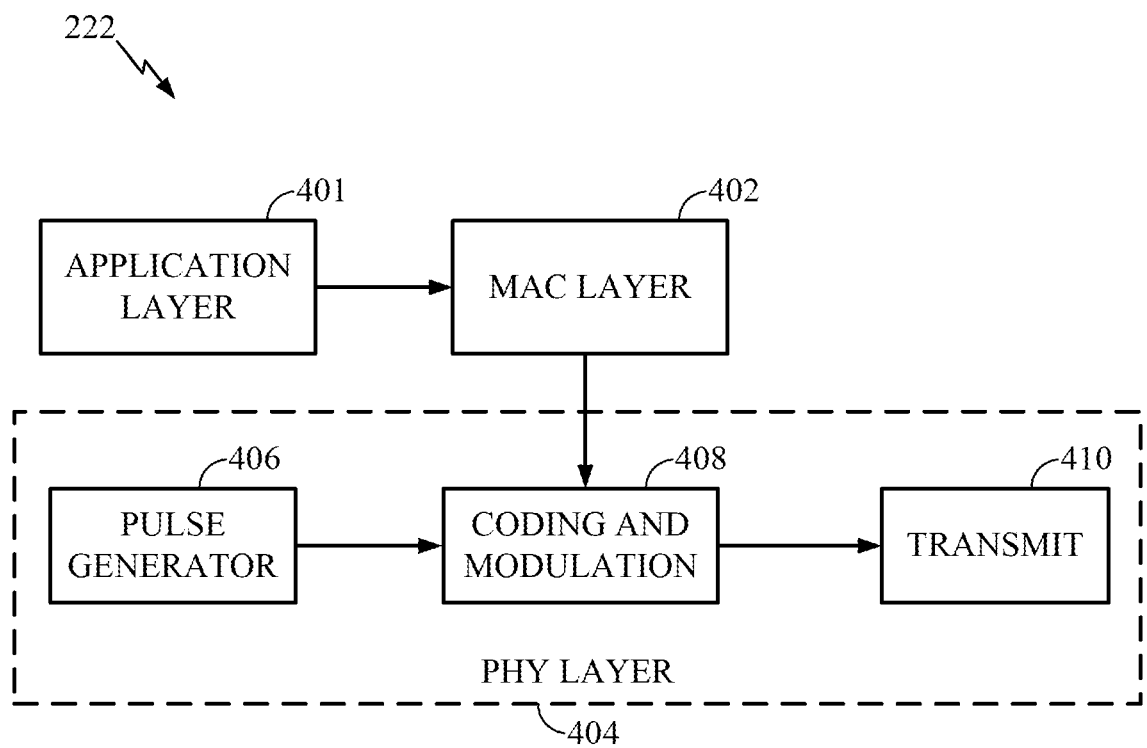
FIG. 2 is a block diagram illustrating an example of the transmitter of the mobile device of FIG. 1.

FIG. 2 is a block diagram illustrating an example of the transmitter 222 of the device 102. As would be apparent to one of skill in the art, in the illustrated block diagram of FIG. 2, logical modules of the device 102 are illustrated in terms of a layered, abstract description for a communications network. As noted below, each layer may comprise one or more logical modules that may be implemented in software, hardware, or any suitable combination of both. The transmitter 222 may include: (i) an application layer 401 that provides information to a data link or media access control (MAC) layer 402 for transmission, (ii) a media access control (MAC) layer 402 that receives data from the application layer 401 and provides it to a physical layer 404, and (iii) a physical (PHY) layer 404 that receives data from the MAC layer 402 and transmits the data over the wireless channel 106. In the illustrated transmitter 222, the PHY layer includes a pulse generator 406, a coding and modulation block 408, and a transmit block 410. A phase locked loop (PLL) (not shown) may provide timing signals to the PHY layer. The pulse generator 406 generates waveforms such as Gaussian pulse waveforms. The coding and modulation block 408 codes the information signal provided by the MAC layer 402 using a coding scheme such as convolutional coding, block coding or concatenated coding and modulates the pulse signal based on the coded information signal using a scheme such as pulse position modulation, pulse amplitude modulation, or transmitted reference modulation. The transmit block 410 transmits the modulated pulse signal. Functions of the transmit block 410 may include amplifying the modulated pulse signal for transmission and providing the signal to an antenna.

Figure 3:
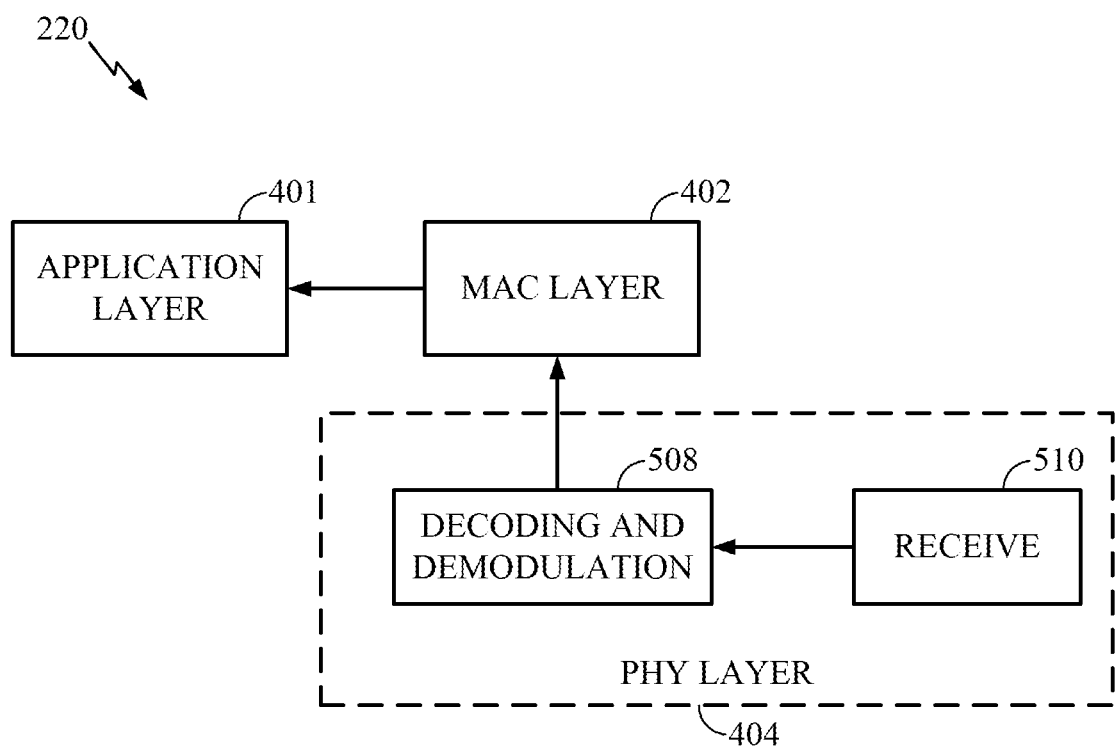
FIG. 3 is a block diagram illustrating an example of the receiver of the mobile device of FIG. 1.

FIG. 3 is a block diagram illustrating an example of the receiver 220 of the device 102. As would be apparent to one of skill in the art, in the illustrated block diagram of FIG. 3, logical modules of the device 102 are illustrated in terms of a layered, abstract description for a communications network. As noted below, each layer may comprise one or more logical modules that may be implemented in software, hardware, or any suitable combination of both. In FIG. 3, the receiver 220 includes the application layer 401 and the MAC layer 402. The PHY layer 404 is in communication with the MAC layer 402. The PHY layer 404 of the receiver includes a demodulation and decoding block 508 and a receive block 510. The receive block 510 may include components (not shown) that may comprise an antenna, a power amplifier, and other suitable receiver components. The receive block 510 receives a wireless signal and provides that signal to the demodulation and decoding block 508, which demodulates and decodes the signal and provides received data to the MAC layer 402.

The receiver 220 and the transmitter 222 may employ a variety of wireless physical layer schemes. For example, the physical layer 404 of the receiver 220 and the transmitter 222 may utilize some form of CDMA, TDMA, OFDM, OFDMA, or other modulation and multiplexing schemes.

Figure 4:
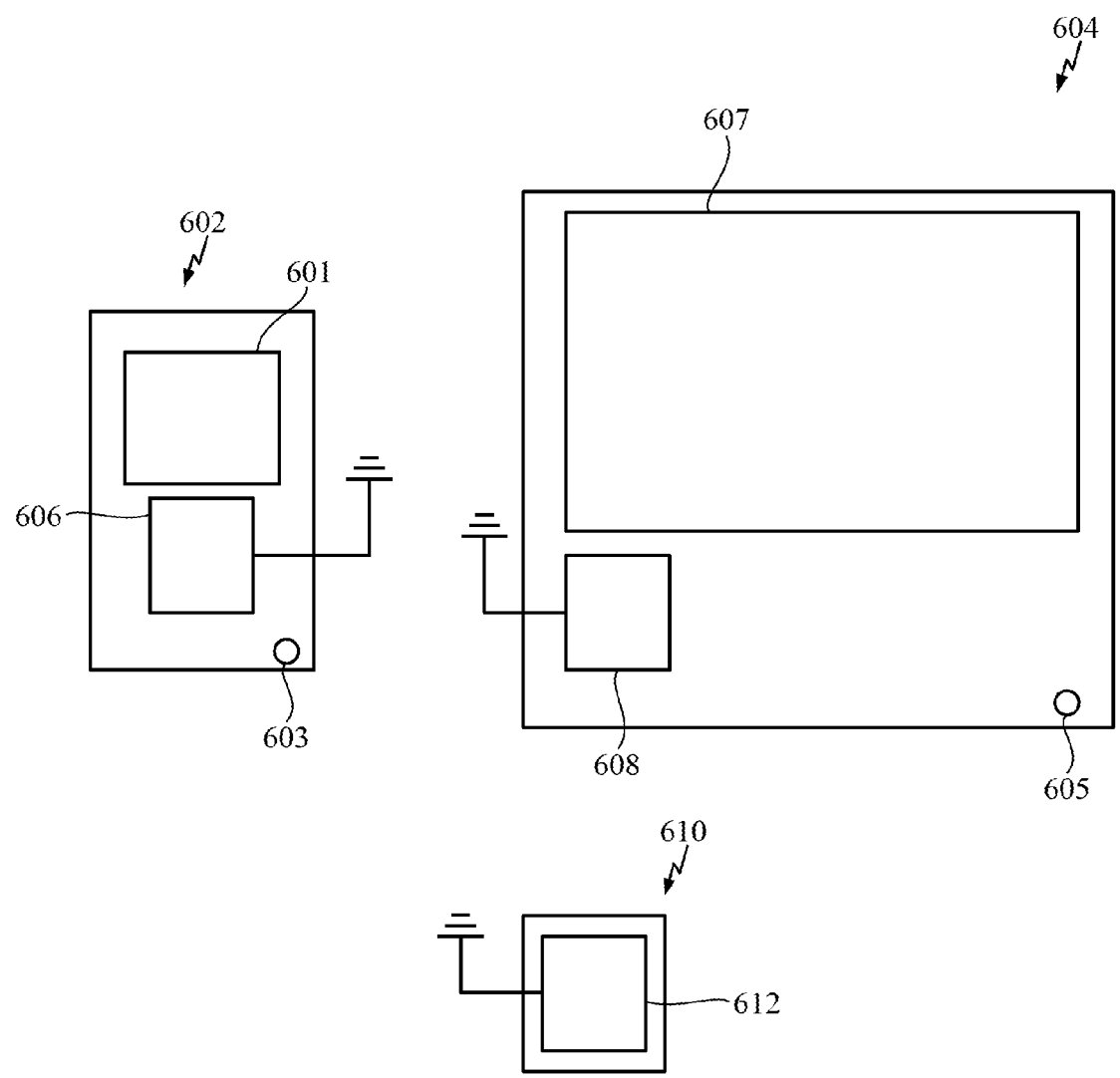
FIG. 4 is a diagram of an embodiment of a mobile device of FIG. 1 connected to a wired device and a wireless device.

FIG. 4 is a block diagram illustrating an embodiment of a mobile device 602 (e.g., device 102), an external device 604, and a wireless device 610. In some embodiments, mobile device 602 comprises at least one of a display 601 (e.g., display 210), a wireless modem 606 (e.g., network interface 225), and one or more wired interfaces 603 (e.g., network interface 208 and/or charge controller 205). In other embodiments, mobile device 602 does not include the display 601. In some embodiments, external device 604 includes a display 607, a wireless modem 608, and a wired interface 605. In other embodiments, external device 604 does not include a wireless modem 608. In some embodiments, wireless device 610 includes a wireless modem 612. Wireless modems 606, 608, and 612 may communicate using the same wireless protocol (e.g. BLUETOOTH, 802.11a, 802.11b, 802.11g, 802.11n, etc.). External device 604 may be, for example an external display device capable of audio and/or video output, an audio device such as an mp3 player, etc. Wireless device 610 may be, for example, a wireless speaker system, a wireless keyboard, wireless headset, etc. One of ordinary skill in the art will recognize that the below described systems and methods may be used in conjunction with many other similar devices. Accordingly, use of the systems and methods below is not confined to just the described examples.

In one embodiment, mobile device 602 is in page scan mode when active and scans for page messages from a wireless capable device in page mode. Mobile device 602 is designed such that even when the wireless modem 606 is turned off, mobile device 602 can automatically connect to another wireless capable device. As discussed above, in order for a wireless connection to be established between devices, devices must be within range. One method of detecting a device is within range even when wireless modem 606 is turned off is to use some other external trigger that indicates a wireless capable device is within range. In response to the external trigger, wireless modem 606 may turn on and wirelessly connect with wireless capable device.

In another embodiment, mobile device 602 is configured to establish a wireless connection with another wireless capable device in response to an external trigger. In some such embodiments, the wireless modem 606 of mobile device 602 may be powered on before the wired connection is detected.

In some embodiments, the external trigger is a detection of a wired connection at wired interface 603 between mobile device 602 and another device. In some embodiments, the wired connection is between mobile device 602 and external device 604. In one such embodiment, the wired connection, for example, may be used for exchange of video data between the mobile device 602 and external device 604. In another embodiment, the wired connection is between mobile device 602 and a charger. In one embodiment the charger is an electrical charger. In another embodiment, the charger is a magnetic charger.

In one embodiment, when mobile device 602 detects connection of a cable at the wired interface 603, the mobile device 602 powers on wireless modem 606 and attempts to connect with another device. In other embodiments, mobile device 602 does not power on wireless modem 606 when it detects a connection of a cable at the wired interface 603. In such embodiments, mobile device 602 may receive a message from the device with which it forms a wired connection. For example, mobile device 602 may form a connection with external device 604 via a wired connection to exchange video data. External device 604 may send a message to mobile device 602 indicating that mobile device 602 should turn on wireless modem 606 and search for other devices. In some embodiments, mobile device 602 connects wirelessly with external device 604. In one such embodiment, mobile device 602 exchanges audio data with wireless device 604 via the wireless connection. In other embodiments, mobile device 602 connects wirelessly with wireless device 610. In one such embodiment, mobile device 602 exchanges audio data with wireless device 604 via the wireless connection.

In some other embodiments, wireless modem 606 is already powered on when mobile device 602 detects connection of a cable at the wired interface 603. In some such embodiments, mobile device 602 may establish a wireless connection with another wireless capable device in response to detecting the wired connection. In other such embodiments, mobile device 602 may wait to receive a message from the device with which it forms a wired connection, and then establish a wireless connection in response to the message.

In some embodiments, mobile device 602 may intelligently turn off wireless modem 606 in response to an external trigger. In one embodiment, when mobile device 602 detects disconnection of a cable at the wired interface 603, the mobile device 602 powers off wireless modem 606. In other embodiments, mobile device 602 powers off wireless modem 606 when it receives a message from the device with which it has established a wired connection. For example, mobile device 602 may have established a connection with external device 604 via a wired connection to exchange video data. External device 604 may send a message to mobile device 602 indicating that mobile device 602 should turn off wireless modem 606.

In some other embodiments, mobile device 602 may terminate a wireless connection in response to an external trigger, without powering off the wireless modem 606. In one embodiment, when mobile device 602 detects disconnection of a cable at the wired interface 603, the mobile device 602 terminates any wireless connections. In other embodiments, mobile device 602 terminates any wireless connections when it receives a message from the device with which it has established a wired connection. For example, mobile device 602 may have established a connection with external device 604 via a wired connection to exchange video data. External device 604 may send a message to mobile device 602 indicating that mobile device 602 should terminate any wireless connections.

In some embodiment, a user may control the powering on and powering off of the wireless modem 606. Further, the user may control establishing and terminating a wireless connection with the mobile device 602. For example, the user may input a command (e.g., push a button) at the mobile device 602 to control the mobile device 602. The user control may be used in addition to the embodiments described above. The user control may override the "default" functioning according to the other embodiments described above.

Figure 5:
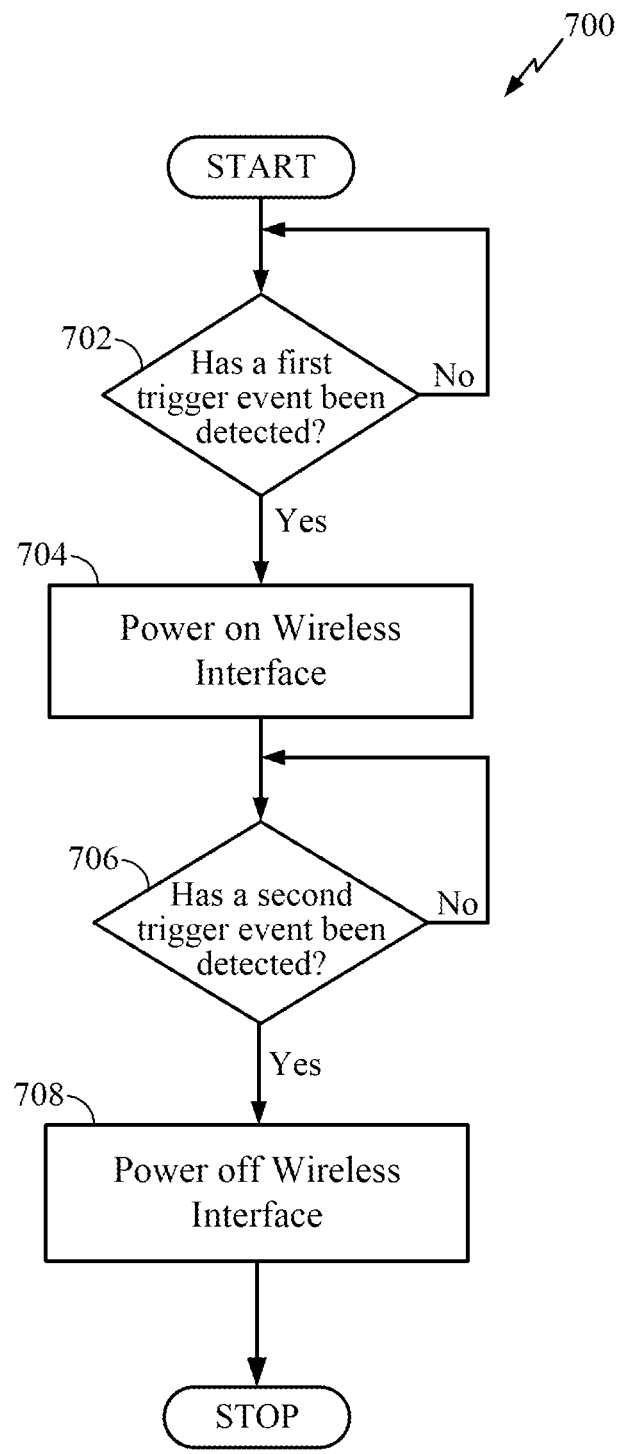
FIG. 5 is a flowchart of an embodiment of a process of triggering a wireless connection between the mobile device and a second device.

FIG. 5 is a flowchart of an embodiment of a process 700 of triggering a wireless connection between the mobile device 602 and a second device. For purposes of this example, it is assumed that wireless modem 606 is initially turned off. At a first step 702 of the process 700, it is determined whether a first trigger event has occurred. In one embodiment, the first trigger event is a cable is attached to wired interface 603 of mobile device 602. In another embodiment, the first trigger event is a message received at mobile device 602 over a wired connection, where the message indicates that wireless modem 606 should be turned on. If it is determined a first trigger event has not occurred, the process returns to step 702. If it is determined a first trigger event has occurred, process 700 continues to step 704. At step 704, the mobile device 602 powers on wireless modem 606 and scans for wireless devices. At a next step 706, it is determined if a second trigger event has occurred. In one embodiment, the second trigger event is a cable is removed from wired interface 603 of mobile device 602. In another embodiment, the second trigger event is a message received at mobile device 602 over a wired connection, where the message indicates that wireless modem 606 should be turned off. If it is determined a second trigger event has not occurred, process 700 returns to step 706. In the alternative, if a second trigger event has occurred, process 700 continues to step 708 where the wireless modem 606 is powered off.

Some embodiments of process 700 may include additional steps, while other embodiments may include fewer steps, or alternate steps. For example, in one embodiment, process 700 includes a step between steps 704 and 706 where mobile device 602 exchanges audio data with a wireless device. Further in some embodiments, step 704 may instead be to initiate a wireless connection and step 708 may be to terminate the wireless connection.

Figure 6:
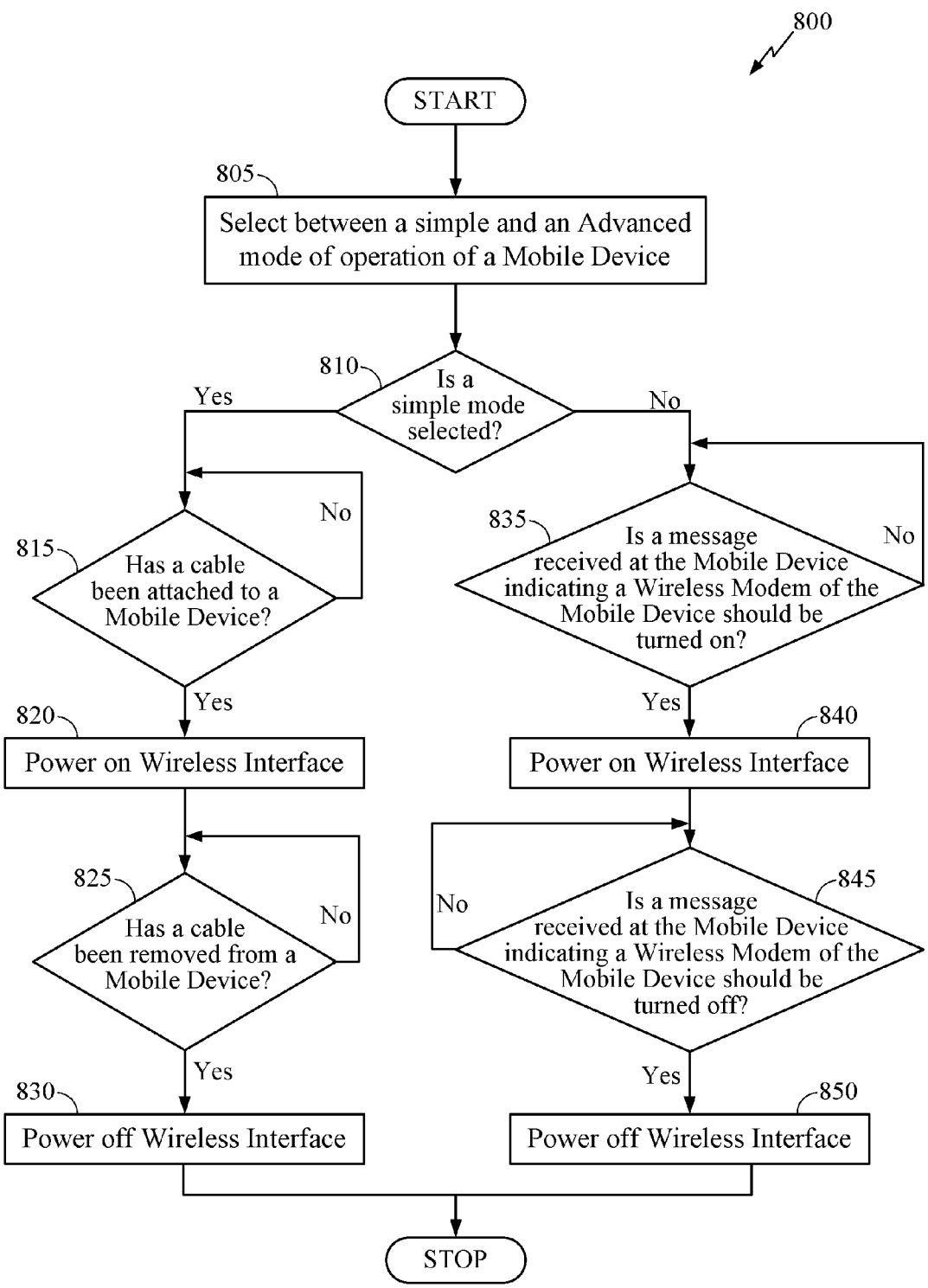
FIG. 6 is a flowchart of another embodiment of a process of triggering a wireless connection between the mobile device and a second device.

FIG. 6 is a flowchart of another embodiment of a process 800 of triggering a wireless connection between the mobile device 602 and a second device. For purposes of this example, it is assumed that wireless modem 606 is initially turned off. At a first step 805, a simple mode of operation or an advanced mode of operation for triggering a wireless connection between the mobile device 602 and the second device is selected. The selection may be made, for example, by a user via input device 212, or automatically by the processor 202. Continuing at a step 810, it is determined if the simple mode of operation is selected. If it is determined the simple mode of operation is selected, the process continues to a step 815. If it is determined the simple mode of operation is not selected, the process continues to a step 835.

At the step 815, it is determined whether a cable is attached to wired interface 603 of mobile device 602. If it is determined a cable is not attached to wired interface 603 of mobile device 602, the process 800 returns to step 815. If it is determined a cable is attached to wired interface 603 of mobile device 602, process 800 continues to step 820. At step 820, the mobile device 602 powers on wireless modem 606 and scans for wireless devices. At a next step 825, it is determined if the cable is removed from wired interface 603 of mobile device 602. If it is determined the cable is not removed from wired interface 603 of mobile device 602, process 800 returns to step 825. In the alternative, if the cable is removed from wired interface 603 of mobile device 602, process 800 continues to step 830 where the wireless modem 606 is powered off.

At the step 835, it is determined whether a message is received at mobile device 602 over a wired connection, where the message indicates that wireless modem 606 should be turned on. If it is determined a message indicating that the wireless modem 606 should be turned on is not received, the process 800 returns to step 835. If it is determined a message indicating that the wireless modem 606 should be turned on is received, process 800 continues to step 840. At step 840, the mobile device 602 powers on wireless modem 606 and scans for wireless devices. At a next step 845, it is determined if a message is received at mobile device 602 over a wired connection, where the message indicates that wireless modem 606 should be turned off. If it is determined a message indicating that the wireless modem 606 should be turned off is not received, process 800 returns to step 845. In the alternative, if it is determined a message indicating that the wireless modem 606 should be turned off is received, process 800 continues to step 850 where the wireless modem 606 is powered off.

Figure 7:
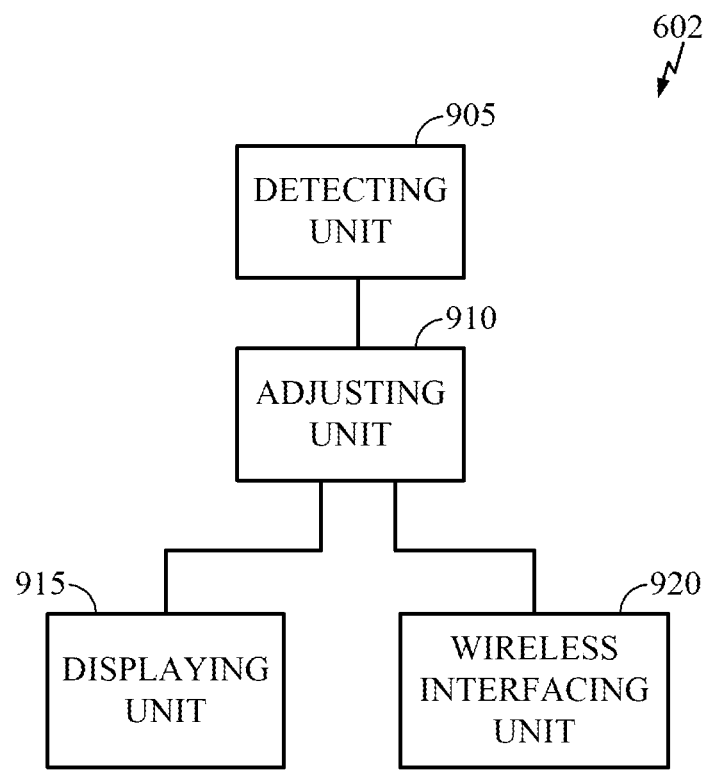
FIG. 7 is a block diagram illustrating another example of a mobile device.

The functionality described herein (e.g., with regard to one or more of the accompanying figures) may correspond in some aspects to similarly designated "means for" functionality in the appended claims. Referring to FIG. 7, the mobile device 602 is represented as a series of interrelated functional modules.

FIG. 7 is a block diagram illustrating another example of a mobile device. As shown, the mobile device 602 may comprise a detecting unit 905, an adjusting unit 910, a displaying unit 915, and a wireless interfacing unit 920. The detecting unit 905 may correspond at least in some aspects to, for example, a network interface, a charge controller, and/or a processor as discussed herein. The adjusting unit 910 may correspond at least in some aspects to, for example, a network controller and/or a processor as discussed herein. The display unit 915 may correspond at least in some aspects to, for example, a display as discussed herein. The wireless interfacing unit 920 may correspond at least in some aspects to, for example, a network interface as discussed herein.

The functionality of the modules of FIG. 7 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

While the specification describes particular examples of the present invention, those of ordinary skill can devise variations of the present invention without departing from the inventive concept. For example, the teachings herein refer to networks with femto cells and macro cells but are equally applicable to networks with other topologies.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of managing a wireless connection, the method comprising:

detecting, by a mobile device, disconnection of a wired connection to the mobile device; and terminating, by the mobile device, a wireless connection, which is independent of the wired connection, based on the detection of the disconnection of the wired connection to the mobile device.

2. The method of claim 1, further comprising detecting a cable connected to the mobile device.

3. The method of claim 1, further comprising receiving a message from a second device over the wired connection.

4. The method of claim 1, further comprising turning off a wireless interface based on the detection of the disconnection of the wired connection.

5. The method of claim 1, further comprising turning on a wireless interface based on detecting connection of the wired connection at the mobile device.

6. The method of claim 1, further comprising establishing the wired connection between the mobile device and a second device.

7. The method of claim 6, further comprising establishing the wireless connection between the mobile device and the second device.

8. The method of claim 1, further comprising establishing the wired connection between the mobile device and a third device.

9. The method of claim 8, further comprising establishing the wireless connection between the mobile device and a second device.

10. The method of claim 1, wherein the wireless connection is a Bluetooth connection.

11. The method of claim 10, wherein the mobile device comprises a Bluetooth modem.

12. The method of claim 1, wherein the mobile device comprises the wireless interface.

13. The method of claim 1, wherein the mobile device comprises a wired interface.

14. The method of claim 13, wherein the wired interface is one of MDDI, USB, Ethernet, magnetic charger, electric charger, DVI, VGA, TVOut, HDMI, or MHL.

15. The method of claim 1, further comprising adjusting power to a wireless interface based on a message received via the wired connection.

16. The method of claim 1, further comprising overriding adjusting power to a wireless interface based on a user input.

17. A wireless communication device comprising:
a wired interface;
a wireless interface configured to form a wireless connection;
a first processing circuit configured to detect disconnection of a wired connection to the wired interface; and
a second processing circuit configured to terminate the wireless connection, which is independent of the wired connection, based on the detection of the disconnection of the wired connection to the wired interface.

18. The wireless communication device of claim 17, wherein the first processing circuit is further configured to detect a cable connected to the mobile device.

19. The wireless communication device of claim 17, wherein the first processing circuit is further configured to detect the disconnecting of a cable initially connected to the mobile device.

20. The wireless communication device of claim 17, wherein the first processing circuit is further configured to receive a message from a second device over the wired connection.

21. The wireless communication device of claim 17, wherein the second processing circuit is further configured to turn off the wireless interface.

22. The wireless communication device of claim 17, wherein the second processing circuit is further configured to turn on the wireless interface.

23. The wireless communication device of claim 17, further comprising a third processing circuit configured to establish a wired connection between the mobile device and a second device.

24. The wireless communication device of claim 23, wherein the second processing circuit is further configured to establish a wireless connection between the mobile device and the second device.

25. The wireless communication device of claim 17, further comprising a third processing circuit configured to establish a wired connection between the mobile device and a third device.

26. The wireless communication device of claim 25, wherein the second processing circuit is further configured to establish a wireless connection between the mobile device and a second device.

27. The wireless communication device of claim 17, wherein the wireless interface is a Bluetooth interface.

28. The wireless communication device of claim 17, further comprising a Bluetooth modem.

29. The wireless communication device of claim 17, wherein the wired interface is one of MDDI, USB, Ethernet, magnetic charger, electric charger, DVI, VGA, TVOut, HDMI, or MHL.

30. The wireless communication device of claim 17, wherein the second processing circuit is further configured to adjust the power to the wireless interface based on a message received via the wired connection.

31. The wireless communication device of claim 17, further comprising a third processing circuit configured to override the second processing circuit based on a user input.

32. A wireless communication device comprising:
means for detecting, by a mobile device, disconnection of a wired connection to the mobile device; and
means for terminating, by the mobile device, a wireless connection, which is independent of the wired connection, based on the detection of the disconnection of the wired connection to the mobile device.

33. A non-transitory computer-readable medium comprising code that, when executed, causes an apparatus to:
detect disconnection of a wired connection to a mobile device; and
terminate a wireless connection, which is independent of the wired connection, based on the detection of the disconnection of the wired connection to the mobile device.

* * * * *